March 27, 1934.  J. H. QUINLAN  1,952,776
COOKING UTENSIL
Filed Aug. 11, 1933
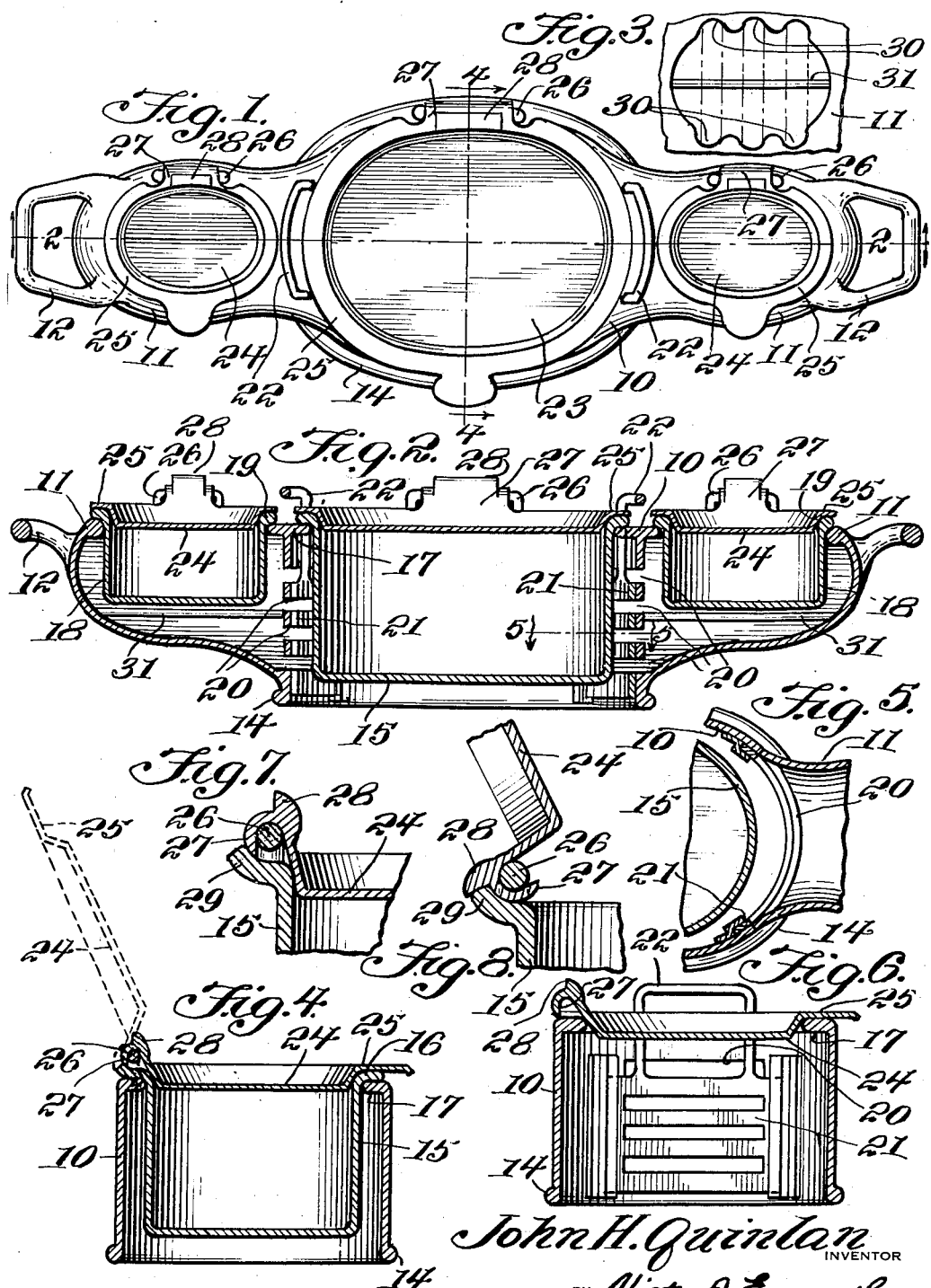
John H. Quinlan, INVENTOR
BY Victor J. Evans & Co., ATTORNEY
WITNESS: J. T. L. Wright Patented Mar. 27, 1934

1,952,776

UNITED STATES PATENT OFFICE 1,952,776

COOKING UTENSIL

John H. Quinlan, Newburgh, N. Y.

Application August 11, 1933, Serial No. 684,715

4 Claims. (Cl. 53—1)

The object of the invention is to provide a cooking utensil designed to hold a plurality of receptacles so that one burner of a range may be employed to cook different foods confined to the different receptacles; to provide a cooking utensil which may be placed on a range for the cooking of foods in the different receptacles and then bodily placed on a table for dispensing the food directly from the receptacles if desired; to provide a cooking utensil arranged to hold a main receptacle and a plurality of supplemental receptacles and provided with means to govern the amount of heat applied to the supplemental receptacles; to provide a cooking utensil adapted for frying operations as well as for boiling; to provide a device of the kind indicated which is adapted for toasting with the degree of heat applied to the toast regulable; and generally to provide a cooking utensil which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is a top plan view of the invention.

Figure 2 is a sectional view on the plane indicated by the line 2—2 of Figure 1.

Figure 3 is a detail plan view of the supplemental receptacle seat.

Figure 4 is a sectional view on the plane indicated by the line 4—4 of Figure 1.

Figure 5 is a sectional view on the plane indicated by the line 5—5 of Figure 2.

Figure 6 is a view similar to Figure 4 but with the receptacle removed and its cover positioned to function as a frying or broiling pan.

Figure 7 is a detail sectional view illustrating the hinge connection between the cover and the receptacle.

Figure 8 is a view similar to Figure 7 showing the cover elevated.

The invention comprises a receptacle carrier in the form of a central annular member 10 and laterally extending diametrically opposed supplemental receptacle carriers 11. The supplemental receptacle carriers are formed as parts of the main receptacle carrier and have their bottoms formed on graceful curves for decorative purposes, the combined carrier being provided with handles 12 by means of which the whole may be carried or shifted from a range to a table or vice versa.

The main receptacle carrier 10 is open on the bottom and its beaded end edge 14 constitutes its means of support. It may thus be set over the burner of a range, so that the flame from the latter will play directly on the receptacle 15 which is supported from its outturned beaded upper edge 16 which rests on the inturned flange 17.

The supplemental receptacle carriers are closed on the bottom by reason of the general construction of the device and the supplemental receptacles 18 are hung from their upper edges by means of the outturned beads 19 with which they are formed.

Set over the burner of a range, the middle receptacle 15 will be subject to direct heat from the flame and whatever food requires the longest cooking will obviously be placed in this receptacle. Foods requiring shorter periods for cooking will be placed in the supplemental receptacles 18 and they will be cooked in a measure by indirect heat, the transfer of the heated air surrounding the main receptacle being effected through openings 20 formed in the wall of the annular member 10 where the supplemental receptacle carriers connect with the latter. The openings 20 are controlled by dampers 21 which are actuable through the instrumentality of handles 22. Thus the dampers may be set to vary the effective area of the openings, so that the amount of heated air transferred may be regulated.

The supplemental receptacles are spaced from both the bottom and side walls of their carriers, so that sufficient space is provided for the circulation of the heated air.

Each of the receptacles is provided with a cover, the main receptacle with a cover 23 and the supplemental receptacles with a cover 24. All of the covers are in the form of dished plates with outturned peripheral flanges 25, so that they seat on the top of the beaded peripheral edges of the receptacle. A hinge connection is provided between each cover and its receptacle in the form of a loop member made of circular stock and bent into U-shaped form, so as to provide a hinge pintle 26 over which the arched leaf extension of the cover member may engage. This arrangement provides a swinging connection between the cover and the receptacle and at the same time a releasable connection between the two by reason of the fact that the leaf extension does not completely embrace the pintle 26. The lug 28 formed on the leaf extension engages an abutment 29 formed on the receptacle adjacent the pintle to limit the upward swinging movement of the cover, as clearly shown in Figure 8. By reason of this construction and the dished formation of the cover, the lower edge, when the cover is raised, is within the area of the receptacle, so that all moisture accumulating on the cover in the cooking operation is immediately drained to the receptacle when the cover is raised.

The receptacles are readily removable from their respective carriers and when either or both of the supplemental receptacles are removed, its particular carrier is adapted for the reception of sliced bread for conversion into toast, the marginal receptacle seats of the supplemental receptacle carriers, for specified distances, being made into sinuous form to provide spaced seats 30 for slices of bread. Below the normal plane of the receptacle, each supplemental receptacle carrier is provided with a rod 31 which acts as a lower rest for the slices of bread. By reason of the seats 30 being spaced, the bread slices are maintained in spaced relation and by proper regulation of the dampers, the desired amount of heated air can be admitted to the particular carrier in which the toasting operation is carried out, so that the desired kind of toast may be produced.

In the use of the utensil, different foods may be cooked in the three utensils, that requiring the longest time for cooking being placed in the main or center receptacle 15. When the utensil is placed on the range, the flame plays directly on the receptacle 15 and the desired amount of heat to effect cooking of the food in the supplemental receptacles is arranged for by the proper regulation of the dampers 21. As the food in any supplemental receptacle is cooked, the damper is closed, so as to shut off the transfer of any heat except what may be transferred by radiation and this obviously will be only sufficient to maintain the food in heated condition.

In such cooking operations as frying or broiling, the utensil is adapted to function effectively. In such a case, the receptacles will be removed and the covers detached and each seated on the upper edge of its particular receptacle carrier, where it will function as a frying or broiling pan. Or the utensil may be used jointly for boiling and broiling or frying operations by employing receptacles in some of the carriers and the lid or lids in the others.

By reason of the main receptacle carrier being entirely open on the bottom and the receptacle mounted therein materially spaced from the lower edge of the same, the utensil when placed on the stove will not be in direct contact with the flame except where the latter may reach the bottom of the main receptacle. Thus the lower or supporting edge of the main receptacle carrier will remain comparatively clean, so that it will be possible to transfer the utensil direct from the range to a table without damage to the latter, since its supporting lower beaded edge will not have been tarnished in the cooking operation and will, therefore, not tarnish the cloth on which it is set.

The invention having been described, what is claimed as new and useful is:

1. A cooking utensil comprising a ring-like receptacle carrier open at the bottom, lateral supplemental receptacle carriers closed at the bottom, and regulable dampers closing the openings of communication between the main receptacle carrier and the supplemental receptacle carriers.

2. A cooking receptacle comprising a plurality of connected receptacle carriers of which one is entirely open on the bottom and the others closed, receptacles removably seated in said carriers, and dampers controlling openings of communication between the open-bottom carrier and the others.

3. A cooking receptacle comprising a plurality of connected receptacle carriers of which one is entirely open on the bottom and the others closed, receptacles removably seated in said carriers, and dampers controlling openings of communication between the open-bottom carriers and the others, the dampers being slidably mounted and provided with handles extending above the plane of the carrier for manual actuation.

4. A cooking receptacle comprising a plurality of connected receptacle carriers of which one is entirely open on the bottom and the others closed, receptacles removably seated in said carriers, and dished covers having releasable hinge connections with the receptacles and peripheral flanges seatable on the upper edges of the receptacles, the receptacles at their upper edges having peripheral beads seatable on the upper edges of the carriers, the receptacles and the covers being selectively seatable on the carriers.

JOHN H. QUINLAN.